United States Patent
Kamath et al.

(10) Patent No.: US 10,825,584 B2
(45) Date of Patent: Nov. 3, 2020

(54) DOWNHOLE LOGGING CABLES WITH CORE CONDUCTOR AND OPTICAL UNITS

(71) Applicant: AFL Telecommunications LLC, Duncan, SC (US)

(72) Inventors: Rajesh Kamath, Kent, WA (US); Brett Villiger, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/302,362

(22) PCT Filed: Jun. 2, 2017

(86) PCT No.: PCT/US2017/035666
§ 371 (c)(1),
(2) Date: Nov. 16, 2018

(87) PCT Pub. No.: WO2017/210548
PCT Pub. Date: Dec. 7, 2017

(65) Prior Publication Data
US 2019/0221334 A1    Jul. 18, 2019

Related U.S. Application Data

(60) Provisional application No. 62/361,201, filed on Jul. 12, 2016, provisional application No. 62/345,424, filed on Jun. 3, 2016.

(51) Int. Cl.
*H01B 7/20* (2006.01)
*H01B 11/22* (2006.01)
*H01B 7/04* (2006.01)
*G02B 6/44* (2006.01)
(Continued)

(52) U.S. Cl.
CPC ............ *H01B 11/22* (2013.01); *G01V 11/002* (2013.01); *G02B 6/443* (2013.01); *G02B 6/4416* (2013.01); *G02B 6/4488* (2013.01); *H01B 1/02* (2013.01); *H01B 7/046* (2013.01); *H01B 7/20* (2013.01)

(58) Field of Classification Search
CPC ... H01B 3/30; H01B 7/02; H01B 7/04; H01B 9/02; H01B 9/04; H01B 9/005; H01B 13/14; H01B 13/067; H01B 13/0165
USPC ..... 174/102 R, 103, 106 R, 108, 109, 110 R, 174/113 R
See application file for complete search history.

(56) References Cited

U.S. PATENT DOCUMENTS 5,892,176 A * 4/1999 Findlay ................ E21B 17/206
174/102 R
7,218,820 B2 * 5/2007 Maida, Jr. ............ G02B 6/4492
385/100
(Continued)

FOREIGN PATENT DOCUMENTS

EP      0643198 A2    3/1995

*Primary Examiner* — William H. Mayo, III
(74) *Attorney, Agent, or Firm* — Dority & Manning, P.A.

(57) ABSTRACT

A downhole logging cable includes a core conductor unit and a core optical unit. The core conductor unit may include a conductor and a jacket which surrounds and contacts the conductor. At least one metal tube may surround the core conductor unit and core optical unit, such that the core conductor unit and core optical unit are disposed in an interior of the at least one metal tube. A filler may be provided in the interior surrounding the core conductor unit and core optical unit.

24 Claims, 1 Drawing Sheet

(51) Int. Cl.
*G01V 11/00* (2006.01)
*H01B 1/02* (2006.01)

(56) References Cited

U.S. PATENT DOCUMENTS

| | | | |
|---|---|---|---|
| 8,000,572 B2 * | 8/2011 | Varkey | B29C 70/088 |
| | | | 385/100 |
| 2003/0169179 A1 * | 9/2003 | James, II | G02B 6/4416 |
| | | | 340/854.9 |
| 2006/0260739 A1 * | 11/2006 | Varkey | B29C 70/088 |
| | | | 156/244.12 |
| 2012/0125596 A1 * | 5/2012 | Homa | E21B 47/123 |
| | | | 166/66 |
| 2015/0170799 A1 * | 6/2015 | Varkey | G02B 6/4416 |
| | | | 174/70 R |

* cited by examiner

DOWNHOLE LOGGING CABLES WITH CORE CONDUCTOR AND OPTICAL UNITS

CROSS-REFERENCE TO RELATED APPLICATIONS

This application is a National Stage Patent Application of PCT/US2017/035666, filed on Jun. 2, 2017, which claims the benefit of priority to U.S. Provisional Patent Application No. 62/361,201, filed on Jul. 12, 2016 and U.S. Provisional Patent Application No. 62/345,424, filed on Jun. 3, 2016, the disclosures of all of which are incorporated by reference herein in their entireties.

FIELD OF THE INVENTION

The present disclosure is generally directed to downhole logging cables, and more particularly to reusable downhole logging cables having relatively small profiles.

BACKGROUND OF THE INVENTION

In industries such as the oil and gas industry, wells are utilized to provide access to raw materials. A variety of cables may be utilized in the wells, and various of these cables may perform specified functions. One type of cable that is utilized in well settings is a downhole logging cable. Logging activities generally include the acquisition and analysis of geophysical data for the geologic formations penetrated by a well borehole. Wireline logging is performed by lowering various logging instruments on the end of a logging cable into a well borehole and recording various properties using a variety of sensors. The logging tools may measure, for example, the natural gamma ray, electrical, acoustic, stimulated radioactive responses, electromagnetic, nuclear magnetic resonance, pressure and other properties of rocks surrounding the borehole and their contained fluids.

Presently known logging cables have relatively large profiles, and are heavy, permanent installations into well boreholes. These cables generally take up a relatively significant portion of a well borehole and cannot be reusable, thus making the overall use of logging cables expensive and inefficient.

Accordingly, improved downhole logging cables are desired in the art. In particular, reusable downhole logging cables which have relatively small profiles would be advantageous. Additionally, reusable downhole logging cables which provide improved strength, temperature resistance, and bending stiffness characteristics while being capable of maintaining electrical and optical pathways to connected logging instruments would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a downhole logging cable is provided. The downhole logging cable includes a core conductor unit and a core optical unit. The core conductor unit may include a conductor and a jacket which surrounds and contacts the conductor. At least one metal tube may surround the core conductor unit and core optical unit, such that the core conductor unit and core optical unit are disposed in an interior of the at least one metal tube. A filler may be provided in the interior surrounding the core conductor unit and core optical unit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
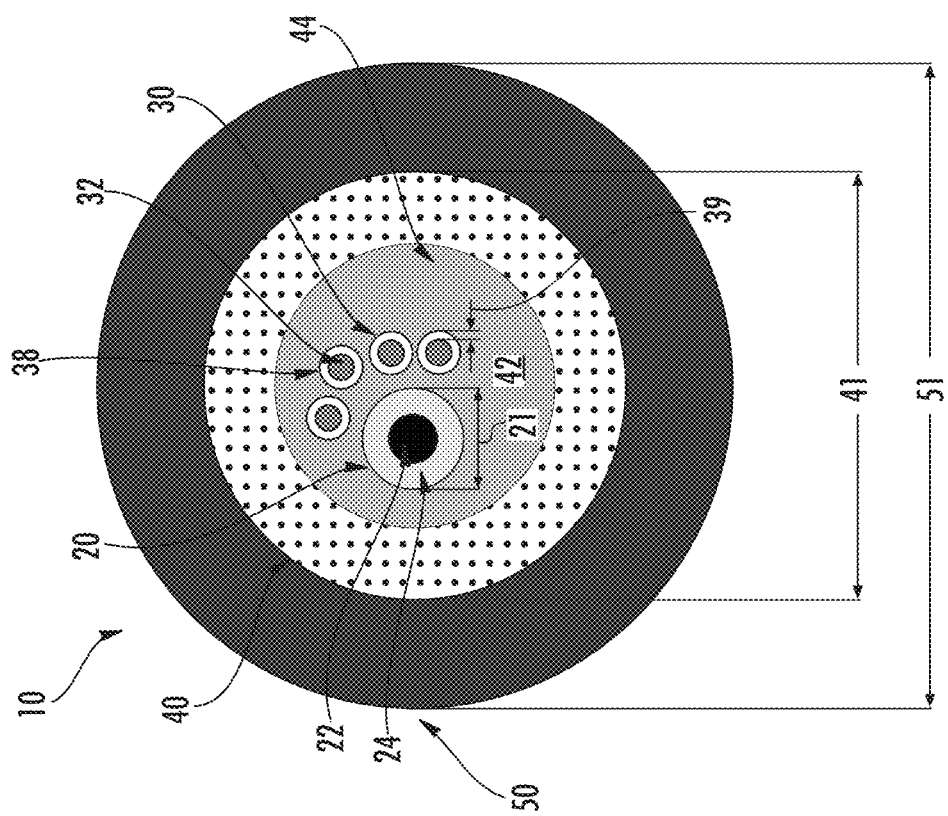
FIG. 1 is a cross-sectional view of a downhole logging cable in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure generally provides an improved downhole logging cable. Logging cables in accordance with the present disclosure are advantageously reusable and have relatively small profiles. Additionally, logging cables in accordance with the present disclosure advantageously provide improved strength, temperature resistance, and bending stiffness characteristics while being capable of maintaining electrical and optical pathways to connected logging instruments. In particular, logging cables in accordance with the present disclosure can operate at relatively extreme temperatures, such as at least as low as −5 degrees Celsius and at least as high as 175 degrees Celsius, without damage to components of the cable. In addition, logging cables in accordance with the present disclosure can withstand tensile loads of up to 1400 pounds or more, such as up to 1800 pounds or more, without damage to components of the cable.

Cables in accordance with the present disclosure include a core conductor unit and a core optical unit. The core conductor unit may include a conductor and a jacket which surrounds and contacts the conductor. These units are disposed within an interior of the cable that is defined by a metal tube surrounding the core conductor unit and core optical unit. Within the interior, a gel may surround and contact the core conductor unit and core optical unit, or the interior may be free from gel and air may surround and contact the core conductor unit and core optical unit. At least one metal tube surrounds the jacket. In exemplary embodiments, a maximum outer diameter of an outer metal tube is less than 4.2 millimeters, such as between 4.1 millimeters and approximately 3.9 millimeters, such as approximately 4 millimeters.

Figure 2:
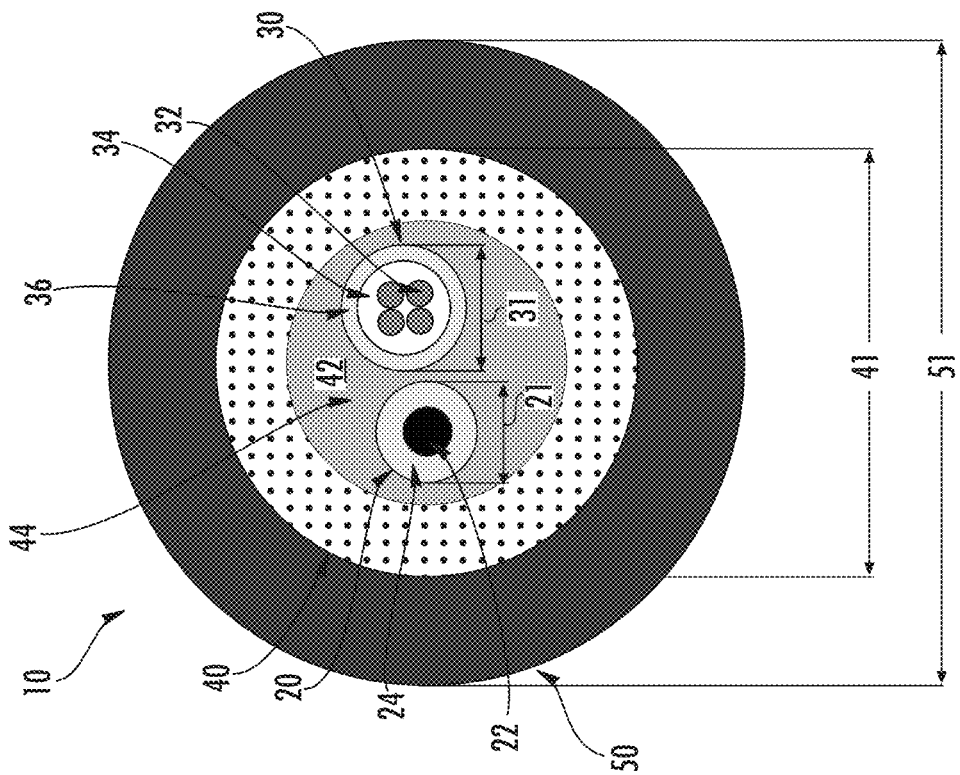
FIG. 2 is a cross-sectional view of a downhole logging cable in accordance with another embodiment of the present disclosure.

Referring now to FIGS. 1 and 2, a downhole logging cable 10 in accordance with the present disclosure is illustrated. Cable 10 includes a core conductor unit 20. The core conductor unit 20 includes a conductor 22. The conductor 22 may, in exemplary embodiments, be formed from copper. In some embodiments, the conductor 22 may be a bare wire (such as a bare copper wire), thus including only the conductor 22 and no outer jacket layer. Alternatively and as illustrated, jacket 24 may surround and be in contact with the conductor 22. In exemplary embodiments, 18 American Wire Gauge ("AWG") wire may be utilized for the conductor 22, although alternatively suitable conductors may be in the range from 18 AWG to 28 AWG.

The core conductor unit 20 may further include a jacket 24 which surrounds and contacts the conductor 22. The jacket 24 in exemplary embodiments may be formed from a suitable polymer. For example, the jacket 24 may be formed from a suitable fluoropolymer, such as an ethylene tetrafluoroethylene (which may in exemplary embodiments be cross-linked), a fluorinated ethylene propylene, or a polytetrafluoroethylene, or alternatively may be formed from a suitable thermoplastic polymer such as a polyamide. The jacket 24 may advantageously protect the conductor 22, allowing the conductor to withstand extreme temperatures and to maintain desired performance over the course of repeated uses involving repeated installations and withdrawals.

The core conductor unit 20 (such as the jacket 24 thereof) may have a relatively small maximum diameter. For example, the unit 20 (such as the jacket 24 thereof) may have a maximum diameter 21 of between 0.6 millimeters and 1.7 millimeters, such as between 0.63 millimeters and 1.65 millimeters.

Cable 10 may further include a core optical unit 30. Optical unit 30 may include one or more optical fibers 32. Optical fibers 32 may be single mode or multi-mode optical fibers. In exemplary embodiments as illustrated, four optical fibers 32 are provided in the core optical unit 30, although alternatively the number of optical fibers 32 may be between one and eight.

The optical fibers 32 may in exemplary embodiments be stranded along a length of the core optical unit 30, such as having a lay length of between 90 millimeters and 350 millimeters, such as between 130 millimeters and 250 millimeters, such as between 140 millimeters and 160 millimeters, such as approximately 150 millimeters. Alternatively, the optical fibers 32 may extend generally linearly along the length of the core optical unit 30.

In some embodiments, as illustrated in FIG. 1, a cladding 34 may surround and encase the optical fibers 32. The cladding in exemplary embodiments may be formed from silicone. A jacket 36 may surround and contact the cladding 34. The jacket 36 may in exemplary embodiments be formed from a polymer. For example, in exemplary embodiments the jacket 36 may be formed from a suitable fluoropolymer, such as a polymethylpentene (i.e. TPX® manufactured by Mitsui Chemicals, Inc.). The jacket 36 may advantageously protect the other components of the optical unit 30 (specifically the optical fibers 32), allowing these components to withstand extreme temperatures and to maintain desired performance over the course of repeated uses involving repeated installations and withdrawals. Notably, the cladding 34 and jacket 36 may be free from reinforcing fibers (or any fibers other than optical fibers 32).

In these embodiments, the core optical unit 30 (such as the jacket 36 thereof) may have a relatively small maximum diameter. For example, the unit 30 (such as the jacket 36 thereof) may have a maximum diameter 31 of between 0.8 millimeters and 1.2 millimeters, such as between 0.82 millimeters and 1.1 millimeters, such as between 0.84 millimeters and 1.09 millimeters.

In other embodiments, as illustrated in FIG. 2, the optical fibers 32 may be individually provided and separated from each other in the cable 10, rather than being all encased together in a collective cladding and jacket. In these embodiments, each optical fiber 32 may include an individual jacket 38 which surrounds and encases the optical fiber 32. The jacket 38 may be formed from a suitable fluoropolymer, such as a perfluoroalkoxy alkane. The jacket 38 may have a relatively small maximum thickness 39, such as between 0.012 millimeters and 0.07 millimeters, such as between 0.0125 millimeters and 0.0625 millimeters, such as in exemplary embodiments approximately 0.0625 millimeters.

One or more metal tubes may surround the core conductor unit 20 and core optical unit 30. The innermost tube of the metal tubes may define an interior 42 in which the core conductor unit 20 and core optical unit 30 are disposed. Additionally, a suitable filler 44 may be provided in the interior 42 to surround and contact the core conductor unit 20 and optical unit 30. For example, in some embodiments, the filler may simply be air. The interior 42 may thus be free from, for example, a gel or other suitable filler material. Alternatively, the filler may be a gel. A suitable hydrogen scavenging gel and/or buffering gel may be utilized as the gel.

As discussed, one or more metal tubes may surround the core conductor unit 20 and optical unit 30. When more than one metal tube is utilized, the tubes may be formed from the same or different materials. For example, in exemplary embodiments, the metal tube(s) may each be formed from a steel, such as a stainless steel. 825, 316 or 625 grade steels are suitable for use as metal tube(s).

In exemplary embodiments as shown, an inner metal tube 40 may surround the core conductor unit 20 and optical unit 30. The inner metal tube 40 may define the interior 42 as discussed herein. The inner metal tube 40 may have relatively small maximum outer diameter. For example, the maximum outer diameter 41 of the inner metal tube 40 may be between approximately 2.2 millimeters and 2.8 millimeters, such as between 2.3 millimeters and 2.6 millimeters, such as between 2.33 millimeters and 2.53 millimeters.

Cable 10 may further include an outer metal tube 50. The outer metal tube 50 may surround and contact the inner metal tube 40. The outer metal tube 50 protects the various interior components 20, 30, 40, thus acting as a protective layer for the cable 10 generally. The outer metal tube 50 may be the outermost layer defining an exterior surface of the cable 10.

The outer metal tube 50 (and thus the cable 10 generally) may have a relatively small maximum outer diameter 51. For example, the maximum outer diameter 51 may be less than 4.2 millimeters, such as between 4.1 millimeters and approximately 3.9 millimeters, such as approximately 4 millimeters.

As discussed, downhole logging cables 10 in accordance with the present disclosure advantageously provide improved strength, temperature resistance, and bending stiffness characteristics while being capable of maintaining electrical and optical pathways to connected logging instruments. In particular, a cable 10 in accordance with the present disclosure may have a particularly desirable bending stiffness. The bending stiffness of a cable in accordance with the present disclosure may, for example, have a K value of between 1.2 lb/in and 1.3 lb/in, such as approximately 1.228 lb/in. The K value may be calculated by suspending a cable sample and introducing a load perpendicular to the cable in the middle of the cable. The K value is the result of the deflection of the cable divided by the introduced load.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A downhole logging cable, comprising:
   a core conductor unit comprising a conductor;
   a core optical unit comprising at least one optical fiber and a jacket surrounding the at least one optical fiber;
   a gel filler surrounding and contacting the core conductor unit and the core optical unit; and
   at least one metal tube defining an aperture within which all of and substantially only the filler, the core conductor unit, and the core optical unit are disposed, wherein a maximum outer diameter of the cable is less than 4.2 millimeters.

2. The downhole logging cable of claim 1, wherein the core conductor unit further comprises a jacket surrounding and in contact with the conductor.

3. The downhole logging cable of claim 2, wherein the jacket comprises a fluoropolymer or a polyamide.

4. The downhole logging cable of claim 1, wherein the conductor is a copper wire.

5. The downhole logging cable of claim 1, wherein the at least one optical fiber is a plurality of optical fibers and the core optical unit further comprises a cladding and the jacket, the cladding surrounding and encasing the plurality of optical fibers, the jacket surrounding and encasing the cladding.

6. The downhole logging cable of claim 5, wherein the cladding is formed from a silicone and the jacket is formed from a fluoropolymer.

7. The downhole logging cable of claim 1, wherein the jacket of the core optical unit individually surrounds and encases the at least one optical fiber.

8. The downhole logging cable of claim 7, wherein the jacket is formed from a fluoropolymer.

9. The downhole logging cable of claim 1, wherein the gel is a hydrogen scavenging gel or a buffering gel.

10. The downhole logging cable of claim 1, wherein the conductor is a bare wire.

11. The downhole logging cable of claim 1, wherein the at least one metal tube comprises an outer metal tube, the outer metal tube being an outermost layer defining an exterior surface of the cable.

12. The downhole logging cable of claim 11, wherein the at least one metal tube further comprises an inner metal tube, the inner metal tube disposed between and in contact with the filler and the outer metal tube.

13. The downhole logging cable of claim 1, wherein the at least one metal tube is formed from a steel.

14. The downhole logging cable of claim 1, wherein the cable has a K value of between 1.2 lb/in and 1.3 lb/in.

15. A downhole logging cable, comprising:
    a core conductor unit comprising a conductor;
    a core optical unit comprising a plurality of optical fibers, a cladding, and a jacket, the cladding surrounding and encasing the plurality of optical fibers, the jacket surrounding and encasing the cladding;
    a gel filler surrounding and contacting the core conductor unit and the core optical unit; and
    at least one metal tube defining an aperture within which all of and substantially only the filler, the core conductor unit, and the core optical unit are disposed, wherein a maximum outer diameter of the cable is less than 4.2 millimeters and the cable has a K value of between 1.2 lb/in and 1.3 lb/in.

16. The downhole logging cable of claim 15, wherein the core conductor unit further comprises a jacket surrounding and in contact with the conductor.

17. The downhole logging cable of claim 15, wherein the at least one metal tube comprises an outer metal tube, the outer metal tube being an outermost layer defining an exterior surface of the cable.

18. The downhole logging cable of claim 15, wherein the at least one metal tube further comprises an inner metal tube, the inner metal tube disposed between and in contact with the filler and the outer metal tube.

19. The downhole logging cable of claim 15, wherein the at least one metal tube is formed from a steel.

20. A downhole logging cable, comprising:
    a core conductor unit comprising a conductor;
    a core optical unit comprising a plurality of optical fibers and a jacket individually surrounding and encasing each of the plurality of optical fibers;
    a gel filler surrounding and contacting the core conductor unit and the core optical unit; and
    at least one metal tube surrounding all of and substantially only the filler, the core conductor unit, and the core optical unit, wherein a maximum outer diameter of the cable is less than 4.2 millimeters and the cable has a K value of between 1.2 lb/in and 1.3 lb/in.

21. The downhole logging cable of claim 20, wherein the core conductor unit further comprises a jacket surrounding and in contact with the conductor.

22. The downhole logging cable of claim 20, wherein the at least one metal tube comprises an outer metal tube, the outer metal tube being an outermost layer defining an exterior surface of the cable.

23. The downhole logging cable of claim 20, wherein the at least one metal tube further comprises an inner metal tube, the inner metal tube disposed between and in contact with the filler and the outer metal tube.

24. The downhole logging cable of claim 20, wherein the at least one metal tube is formed from a steel.

* * * * *